United States Patent
Shaffer et al.

(10) Patent No.: US 6,683,889 B1
(45) Date of Patent: Jan. 27, 2004

(54) APPARATUS AND METHOD FOR ADAPTIVE JITTER BUFFERS

(75) Inventors: Shmuel Shaffer, Palo Alto, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/440,456

(22) Filed: Nov. 15, 1999

(51) Int. Cl.[7] .................................................. H04J 3/06
(52) U.S. Cl. ........................................ 370/516; 375/372
(58) Field of Search ................................ 370/516, 517, 370/230.1, 232, 233, 519; 375/371, 372; 709/232, 233, 234, 235

(56) References Cited

U.S. PATENT DOCUMENTS

| | | | |
|---|---|---|---|
| 4,147,895 A | 4/1979 | Fenoglio ........................ 179/15 |
| 5,146,477 A | 9/1992 | Cantoni et al. .............. 375/112 |
| 5,528,598 A * | 6/1996 | Ng .............................. 370/506 |
| 5,534,937 A | 7/1996 | Zhu et al. .................... 348/466 |
| 5,550,877 A | 8/1996 | Waters ......................... 375/372 |
| 5,621,775 A | 4/1997 | Etienne ........................ 375/372 |
| 5,640,388 A | 6/1997 | Woodhead et al. ......... 370/468 |
| 5,652,627 A | 7/1997 | Allen ........................... 348/497 |
| 5,757,871 A | 5/1998 | Furukawa et al. .......... 375/372 |
| 5,764,298 A | 6/1998 | Morrison ..................... 348/500 |
| 5,778,218 A | 7/1998 | Gulick ......................... 395/558 |
| 5,872,789 A | 2/1999 | Orleth et al. ................ 370/517 |
| 5,872,823 A * | 2/1999 | Sutton ......................... 375/372 |
| 5,881,245 A | 3/1999 | Thompson ............. 395/200.49 |
| 5,940,479 A | 8/1999 | Guy et al. |
| 6,301,258 B1 * | 10/2001 | Katseff et al. .............. 370/412 |
| 6,377,931 B1 * | 4/2002 | Shlomot ...................... 704/503 |
| 6,452,950 B1 * | 9/2002 | Ohlsson et al. ............. 370/516 |

* cited by examiner

Primary Examiner—Min Jung

(57) ABSTRACT

A jitter buffer controller allows the depth of the jitter buffer to be adjusted dynamically according to the varying jitter of the current sequence. The contents of the jitter buffer are examined during a transmission. If the delay or average delay within the buffer drops to a predetermined threshold, then the size or depth of the jitter buffer is increased.

10 Claims, 6 Drawing Sheets

US 6,683,889 B1

APPARATUS AND METHOD FOR ADAPTIVE JITTER BUFFERS

CROSS REFERENCE TO RELATED APPLICATION

This application is related to application Ser. No. 09/440,215, titled "Jitter Buffer Adjustment Algorithm," filed concurrently herewith, and incorporated by reference herein in its entirety as if fully set forth herein.

BACKGROUND OF THE INVENTION

1. Field of the Invention

The present invention relates to packet transmission and, particularly, to a system and method for optimizing a jitter buffer.

2. Description of the Related Art

When sending voice data across packet networks, such as telephony over LAN (ToL) or Voice over IP (VoIP) networks, the voice is usually compressed, packetized and, finally, sent across the network to the destination. When the packets are sent into the network, they are generated at a constant rate. However, due to behavior of the packet network, the even time intervals between the packets are lost as the packets transit the network. This irregularity in packet separation is referred to as "jitter." Jitter can cause clicks, delays and other annoyances in multimedia transmission, creating overall poor reproduction quality.

A jitter buffer is often used to even out the packet separation. A jitter buffer is a FIFO (first in, first out) buffer in which packets leave the buffer at a predetermined, constant rate. Minimizing the amount of actual jitter buffering is important because the jitter buffering process introduces delays in the reproduced signal. As the delay increases, the echo perception becomes more pronounced, resulting in reduced voice quality. However, under-buffering increases the risk of emptying the payload from the jitter buffer before the subsequent packet arrives, resulting in reduced voice quality because of inter-packet gap.

Jitter rates vary throughout a transmission sequence. A jitter rate is the average variance in packet arrival times. It is measured as packets arrive over a specific implementation defined interval. The actual jitter rate reported (in accordance with IETF RFC 1889) is an exponentially averaged value of the jitter for each packet over the interval. The distribution of the averaged jitter rate is significantly different from the actual jitter values, so common queueing theory solutions are not applicable.

A jitter buffer designed with a constant predetermined depth is referred to as a static jitter buffer. A static jitter buffer does not recognize each sequence's unique jitter characteristics and can not adjust itself to meet the needs of individual sequences. FIG. 1 illustrates buffer occupancy as a function of time. The jitter buffer has a maximum size $T_A$. The jitter buffer is depleted at a constant rate, typically less than the arrival rate, represented by the downward sloping lines of common slope, $m_1$–$m_6$. Packets arrive at varying times (typically in blocks of 30–60 msec), $t_0$–$t_5$, resulting in the buffer occupancy "jumps." As can be seen, a larger than usual inter-packet gap (and hence, buffer re-fill) occurs between times $t_2$ and $t_3$. However, the buffer is still depleted at the constant, predetermined rate. While packets arrive at times $t_3$ and $t_4$, if the inter-packet gap is larger than the time required to empty the buffer of any remaining packets, the buffer will be emptied, as seen at time $t_5$. This causes gaps in the received speech, perceived as "choppiness." While the buffer size $T_A$ could be increased, too large a buffer results in delayed packets and speech degradation. The inflexibility of the static jitter buffer degrades the smoothing capability of the jitter buffering process, thereby failing to provide sufficient buffering for some sequences while unnecessarily delaying others.

SUMMARY OF THE INVENTION

These and other drawbacks in the prior art are overcome in large part by a system and method according to the present invention. A jitter buffer controller according to the present invention allows for dynamic adjustment of the jitter buffer depth. A system according to the present invention tunes the jitter buffer length according to the specific characteristics of the packet arrival rate.

According to one implementation, the contents of the jitter buffer are examined during a transmission. If the delay or average delay within the buffer drops to a predetermined threshold, then the size or depth of the jitter buffer is increased. A jitter buffer controller according to the present invention allows the depth of the jitter buffer to be adjusted dynamically according to the varying jitter of the current sequence. The jitter buffer controller may also maintain a cache of previous jitter values, i.e., the typical delays within the jitter buffer. The values may be analyzed and used, such as by averaging, to determine whether the depth of the jitter buffer should be increased, decreased, or maintained as is.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–8 illustrate a system and method for adjusting jitter buffers in telephony over LAN (ToL) or Voice Over IP (VoIP) networks. According to an embodiment of the invention, the depth or maximum occupancy of a jitter buffer is adjusted based on an analysis of the buffer jitter data. It is noted that the teachings of the present invention are applicable to any transmission medium in which data is produced at a constant rate but where the transmission medium perturbs the rate. Thus, the figures are exemplary only.

Figure 1:
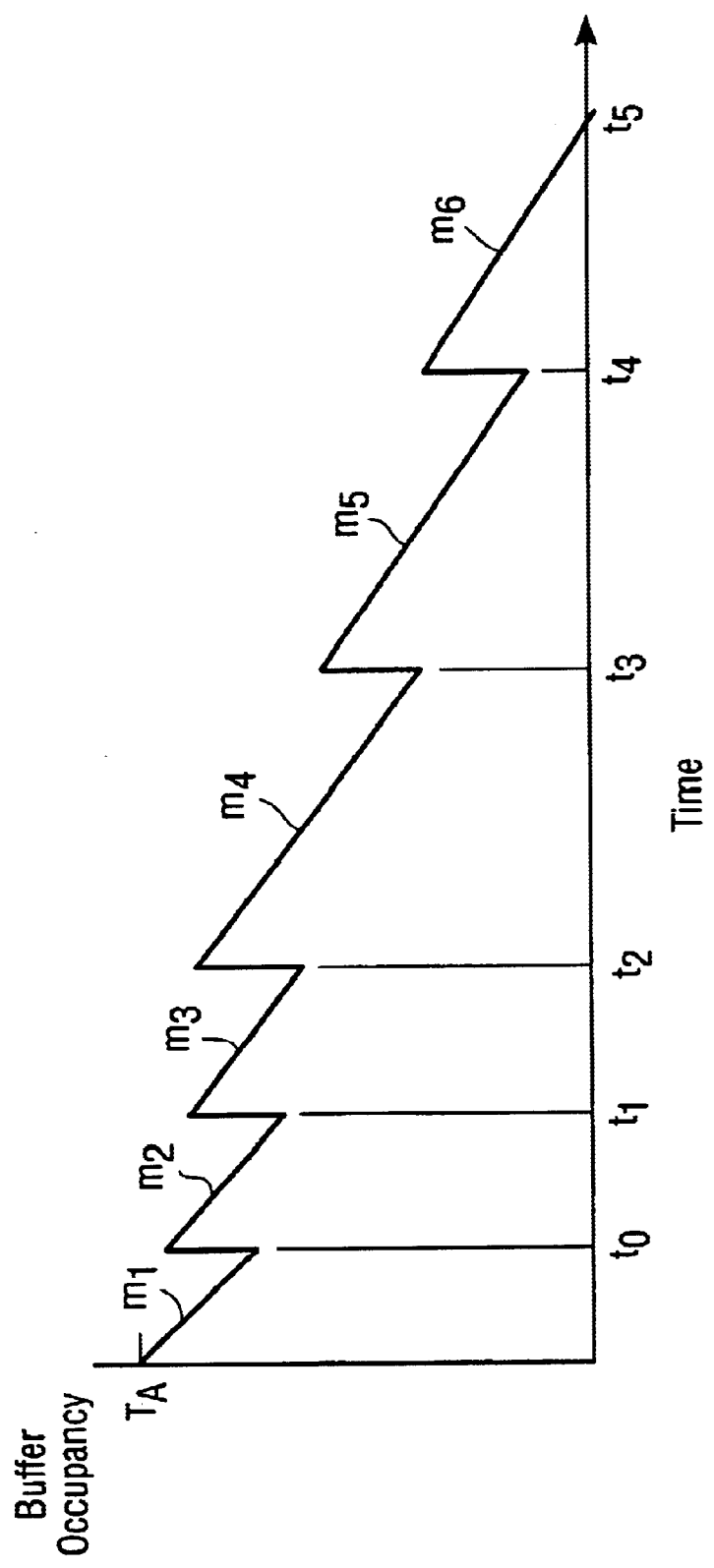
FIG. 1 is a diagram schematically illustrating operation of a static jitter buffer.
Figure 2:
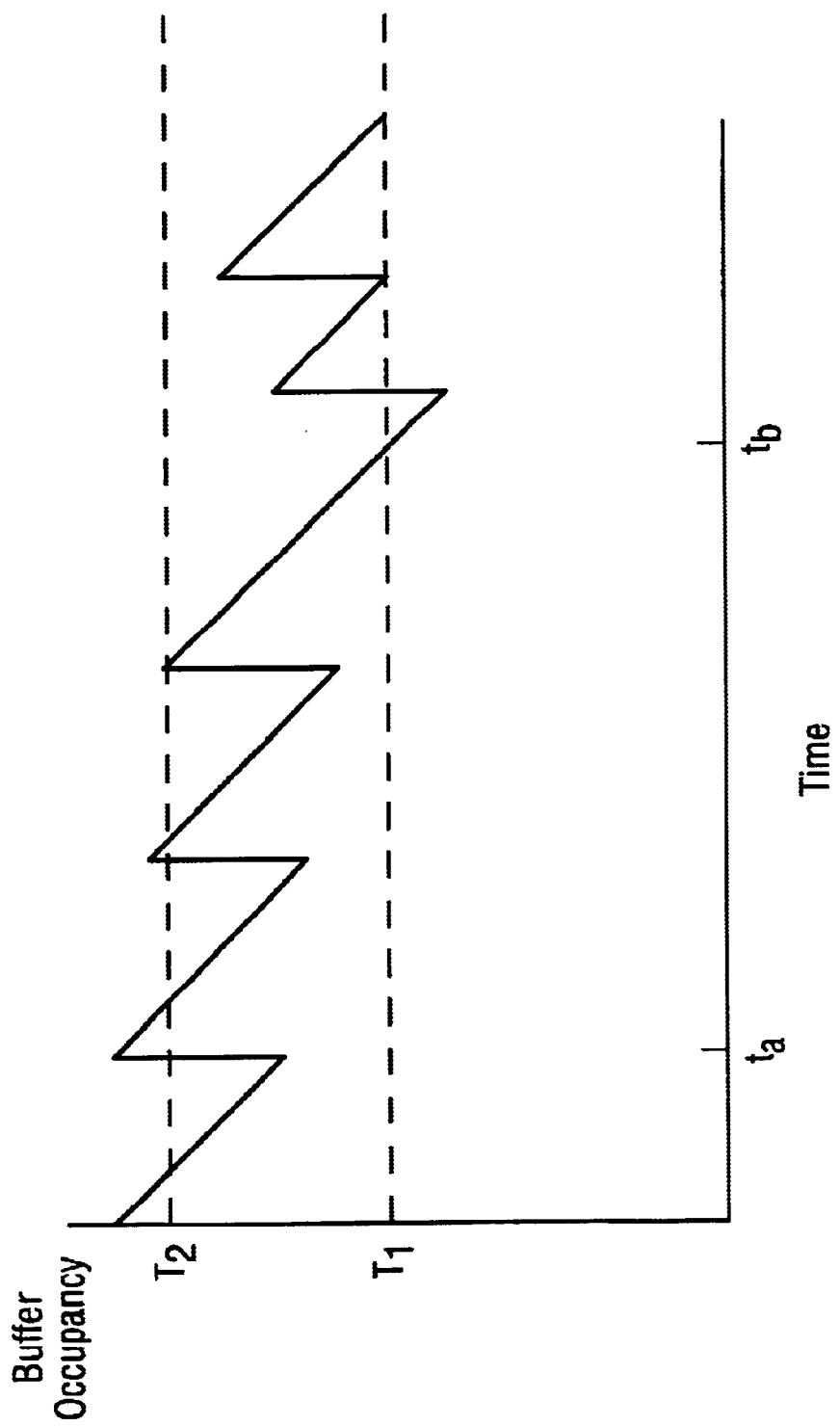
FIG. 2 is a diagram schematically illustrating operation of a jitter buffer according to the present invention.

Operation of an embodiment of the invention is illustrated schematically with reference to FIG. 2. FIG. 2 illustrates a graph of buffer occupancy versus time, similar to FIG. 1. However, according to the present invention, thresholds T1 and T2 are set as relative allowed buffer occupancy thresholds. If the thresholds are ever crossed, the buffer size is changed in response. Increments of the buffer size change may be about 50–60 msec, or roughly equivalent to packet size. Buffer size change is effected, for example, by detecting silent periods and inserting silence or removing silence. Silence detection techniques are known and will not be described further. Each time the buffer size is changed in response to the crossing of a threshold T1, T2, the thresholds are reset.

More particularly, turning back to FIG. 2, at a time $t_a$, the buffer occupancy has exceeded the threshold T2. Thus, the delay within the buffer is too long and should be decreased, according to the present invention. Similarly, at time $t_b$, the buffer occupancy falls below the threshold T1. In this case, the buffer size is increased. In either case, once the jitter buffer size is changed, the thresholds are reset.

Figure 3:
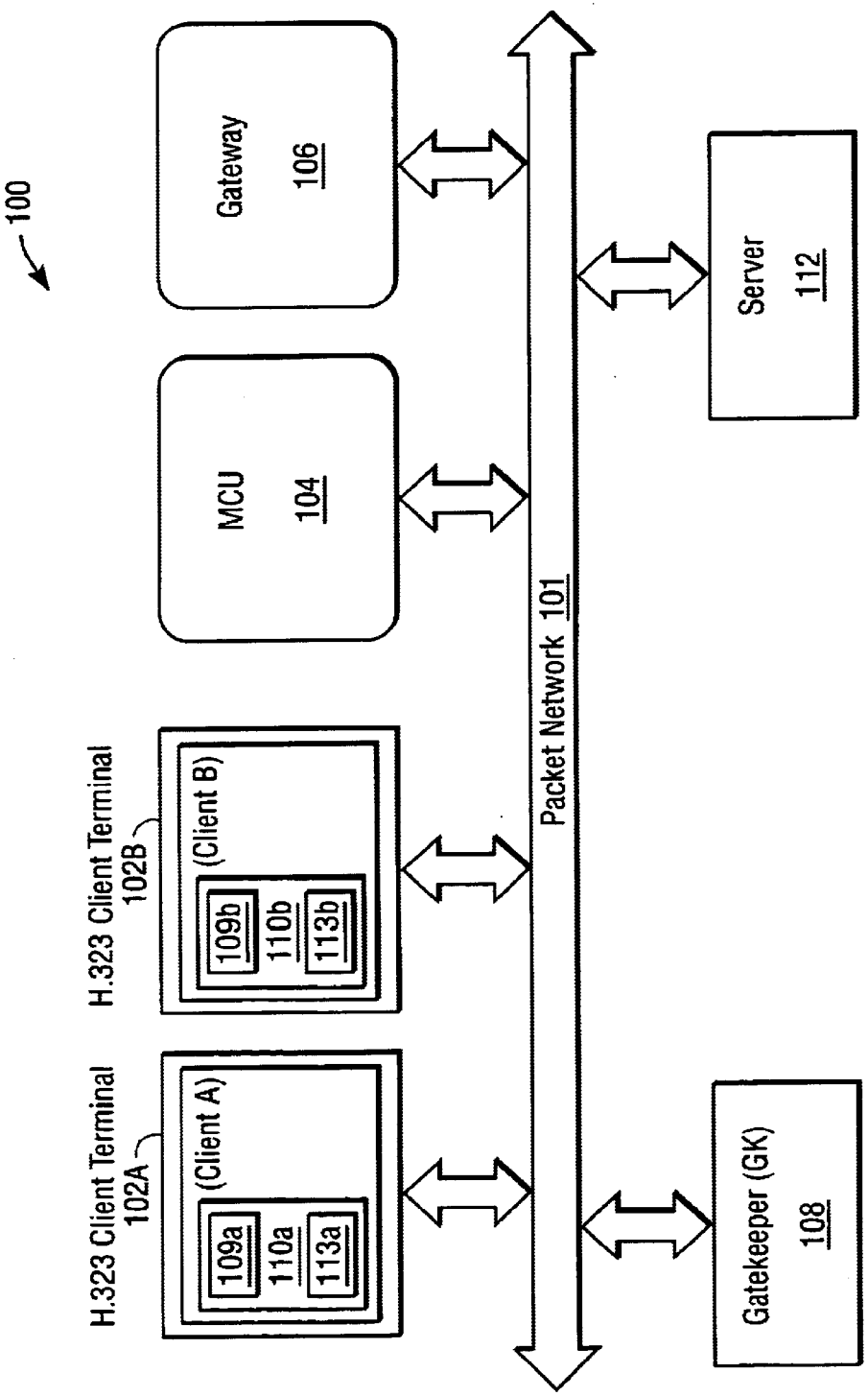
FIG. 3 is a block diagram of an exemplary telephony over LAN (ToL) network according to an embodiment of the invention.

Turning now to FIG. 3, an exemplary telecommunications system 100 according to an embodiment of the invention is shown therein. The telecommunications system 100 includes a local area network (LAN) or packet network 101. As shown, the telecommunications network is embodied as an H.323 compliant network. It is noted, however, that any type of multimedia packet network or network employing time dependent data may be employed. As shown, coupled to the LAN 101 are a variety of H.323 terminals 102a, 102b, a multi-point control unit (MCU) 104, an H.323 gateway 106, an H.323 gatekeeper 108, a LAN server 112, and a plurality of other devices such as personal computers (not shown).

The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 102a, 102b include jitter buffers 113a, 113b and jitter buffer controls 110a, 110b according to the present invention. As will be described in greater detail below, the jitter buffer controls 110a, 110bfunction to identify jitter behavior. Jitter buffer depth is adjusted based on this analysis. It is noted that other network entities, such as the gateway 106, may also include jitter buffers according to the present invention. Thus, the figures are exemplary only.

Figure 4:
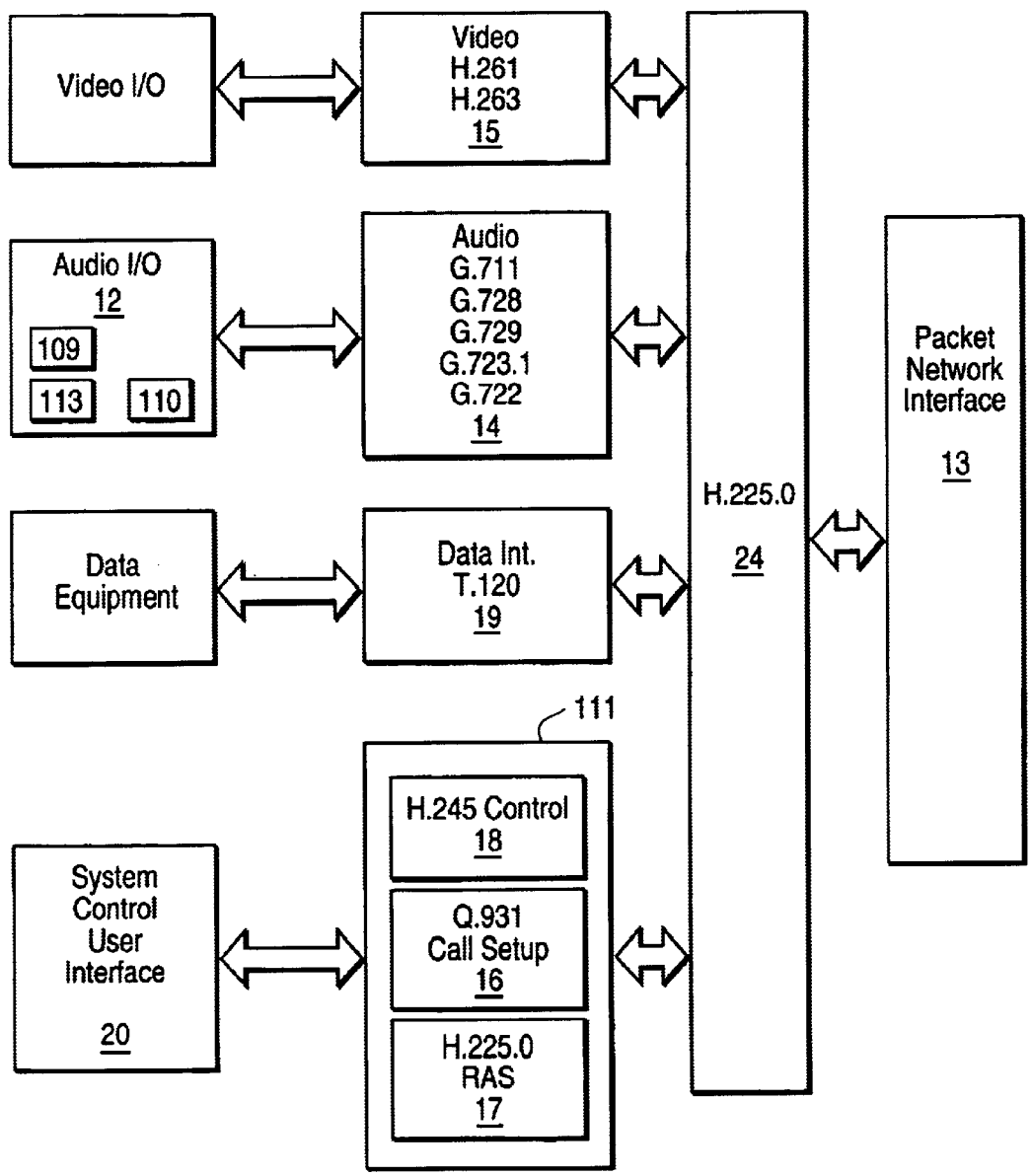
FIG. 4 is a logic diagram of an exemplary telephony over LAN (ToL) client according to an embodiment of the invention.

In accordance with a specific embodiment, FIG. 4 illustrates a logical diagram of an H.323 interface of a terminal 102 to the LAN 101. The H.323 interface includes a jitter buffer control 110 according to the present invention and a packet network interface 13 that is coupled to the network terminal 102. As will be discussed in greater detail below, the network terminal 102 utilizes the ITU-T H.323 Recommendation protocol. The network interface 13 couples the network terminal 102 to the LAN 101. The network can include packet-switched Transmission Control Protocol/Internet Protocol (TCP/IP) and Internet Packet Exchange (IPX) over Ethernet, Fast Ethernet and Token Ring networks.

The H.323 terminal 102 is coupled to a video input/output (I/O) interface 28, an audio I/O interface 12, a data equipment interface 40, and a system control user interface (SCUI) 20. A jitter buffer 113, a jitter buffer control 110, and a jitter buffer cache 109 may be formed in association with the audio I/O 12. A jitter buffer control and cache may similarly be associated with the video I/O 28, but are omitted for convenience. Thus, the figures are exemplary only. The jitter buffer control 110 functions, in conjunction with the jitter buffer cache, to analyze jitter behavior and adjust jitter buffer depth in response thereto. The actual packetization occurs within the codec in response to the jitter buffer control command.

The network terminal 102 further includes an H.225.0 layer 24, an audio coder/decoder (codec) 14 and may include, a video codec 15, and a T.120 data interface layer 19. The audio I/O interface or card 12, which may be part of the standard H.323 device, connects to the audio codec 14, such as a G.711 codec, for encoding and decoding audio signals. The audio codec 14 is coupled to the H.225.0 layer 24. It encodes audio signals for transmission and decodes the received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes the received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled via the SCUI 20 and, particularly, the control layer 111.

The control layer 111 also includes a Q.931 layer 16, an H.225.0 RAS layer 17 and an H.245 layer 18. Thus, the SCUI 20 interfaces to the H.245 layer 18 which is the media control protocol that allows capability exchange, opening and closing of logical channels, mode preference requests, flow control messages, and other miscellaneous commands and indications. The SCUI 20 also interfaces to the Q.931 protocol 16, which defines the setup, teardown, and control of H.323 communication sessions. The SCUI 20 further interfaces to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from the Q.931 layer 16 is the protocol for establishing a connection among two or more terminals and also formats the transmitted video, audio, data, signaling, and control streams into messages for communication via the network interface 13 (e.g., packet network 101). The H.225.0 layer 24 also retrieves the received video, audio, data, signaling and control streams from messages that have been input from the network interface, routes the signaling and control information to the control layer 111 and routes media streams to the appropriate audio, video and data interfaces.

Figure 5:
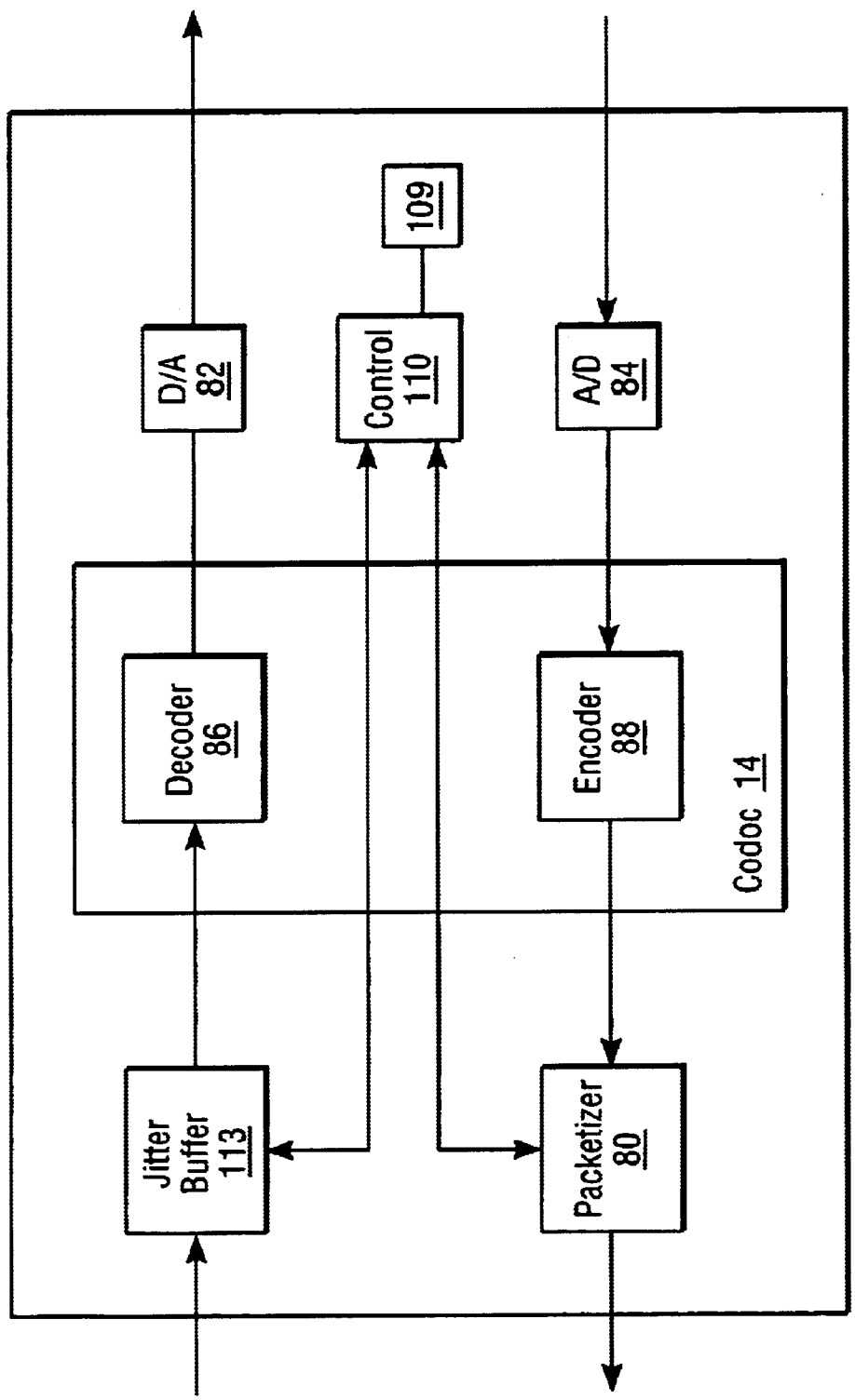
FIG. 5 is a block diagram of an exemplary codec and audio I/O interface according to an embodiment of the present invention.

An exemplary audio I/O and audio codec according to an embodiment of the present invention is shown in FIG. 5. A codec 14 includes an encoder 88 for encoding audio data and a decoder 86 for decoding incoming audio data. The decoder 86 is coupled to a digital-to-analog converter 82. Similarly, the encoder 88 is coupled to an analog-to-digital converter 84. A jitter buffer 113 is provided at the input to the decoder 86. A packetizer 80 is provided at the output of the encoder 88. The packetizer 80 formats outgoing audio data into data packets for transmission over the data network. A controller 110, which may be embodied as a known microcontroller, controls operation of the jitter buffer 113 and the packetizer 80. As will be explained in greater detail below, the controller 110, in conjunction with the jitter buffer cache 109, monitors jitter behavior and adjusts jitter buffer depth based on an analysis of jitter. The controller 110 may include a timer to time the intervals between incoming packets. Time interval and jitter information is then stored in the jitter cache 109. The time interval information may then be analyzed to determine jitter characteristics for the jitter buffer. A dynamic jitter buffer control according to the present invention dynamically adjusts jitter buffer depth to minimize the delay while ensuring that the speech gaps are kept at zero.

Figure 6:
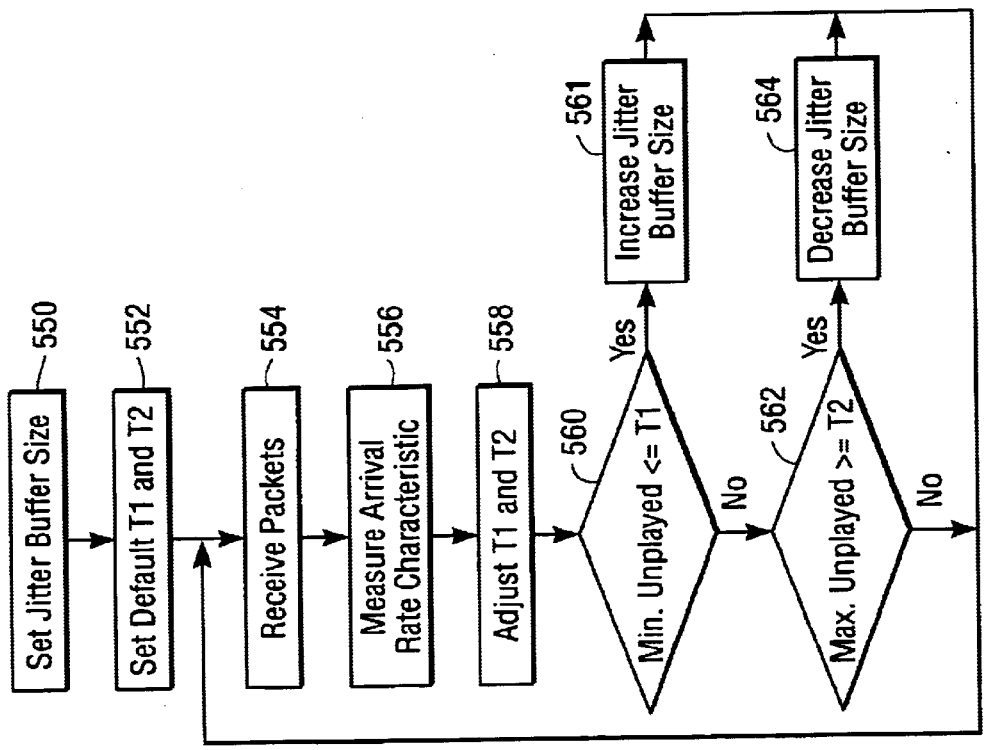
FIG. 6 is a flowchart illustrating operation of an embodiment of the invention.

This procedure is illustrated with reference to FIG. 6. In particular, in a step 550, a jitter buffer size is set to a predetermined depth. In a step 552, predetermined default thresholds T1 and T2, related to the default depth set above, are themselves set. In a step 554, packets are received into the jitter buffer. In a step 556, the jitter buffer controller measures jitter arrival rate characteristics, such as the length of inter-packet gaps and the like. In a step 557, the thresholds T1 and T2 may be adjusted if necessary. In a step 558, the jitter buffer controller determines if the minimum unplayed jitter buffer occupancy has fallen below the threshold T1. If so, then in a step 561, the jitter buffer depth is increased. Otherwise, in a step 562, the jitter buffer controller determines if the maximum unplayed jitter buffer occupancy exceeds the threshold T2. If so, then in a step 564, the jitter buffer size is decreased. As discussed above, voice playback may be adjusted upwards or downwards, or silent periods increased or decreased.

Figure 7:
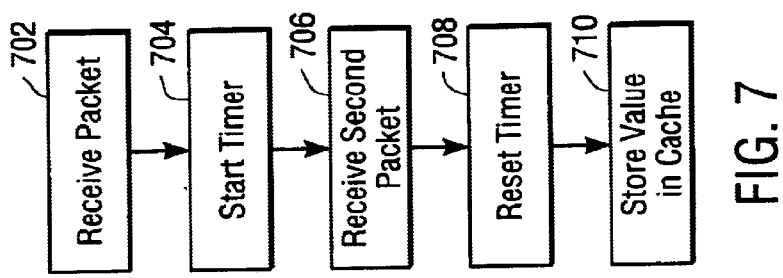
FIG. 7 is a flowchart illustrating operation of an embodiment of the invention.

Determination of the time between packets or inter-packet gap is shown in FIG. 7. In a step 702, the jitter buffer receives a data packet. In a step 704, a timer is activated which counts until a next packet is received, in a step 706. The timer is reset in a step 708 and the time value is stored in the jitter buffer cache in a step 710. The value may be used by itself or in conjunction with other timing values to determine whether thresholds have been met.

Figure 8:
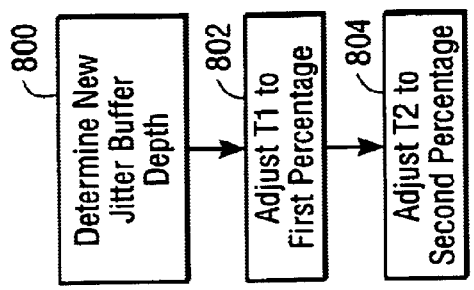
FIG. 8 is a flowchart illustrating operation of an embodiment of the invention.

As noted above, the thresholds T1 and T2 may be adjusted once the jitter buffer size has been adjusted. More particularly, according to one embodiment, the jitter buffer controller accesses a memory for the predetermined percentages and applies them to the new jitter buffer depth. An exemplary method of doing so is shown in FIG. 8. In a step 800, the new buffer depth or maximum allowed occupancy is determined. In a step 802, the threshold T1 is set by determining a percentage of the new jitter buffer depth. In a step 804, the threshold T2 is determined by determining a second percentage of the new jitter buffer depth.

What is claimed:

1. A telecommunications method, comprising:

setting a jitter buffer occupancy threshold;

receiving data into a jitter buffer; and adjusting a depth of said jitter buffer if said jitter buffer occupancy threshold is crossed, said adjusting comprising increasing or decreasing periods of silence.

2. A telecommunications method according to claim 1, said adjusting comprising decreasing said depth.

3. A telecommunications method according to claim 1, including activating a timer upon reception of a packet and stopping said timer upon reception of a next packet.

4. A method according to claim 3, said adjusting comprising employing silence suppression.

5. A telecommunications system, comprising:

a packet network; and a jitter buffer system, said jitter buffer system including a jitter buffer, a jitter buffer cache, and a jitter buffer controller, said jitter buffer controller configured to monitor packets arrivals and adjust a depth of said jitter buffer if a jitter buffer occupancy crosses a jitter buffer occupancy threshold, said jitter buffer controller adjusting said depth by increasing or decreasing periods of silence.

6. A telecommunications system according to claim 5, wherein said jitter buffer cache is configured to store values corresponding to one or more time intervals, and said jitter buffer controller is configured to average said stored values.

7. A telecommunications system according to claim 6, said jitter buffer controller configured to activate a timer upon reception of a packet and stop said timer upon reception of a next packet.

8. A telecommunications device, comprising:

a jitter buffer;

a jitter buffer cache configured to store one or more values related to time intervals between packets; and a jitter buffer controller configured to adjust a depth of said jitter buffer by increasing or decreasing periods of silence based on said one or more values stored in said jitter buffer cache.

9. A telecommunications device according to claim 8, said jitter buffer controller further configured to average said one or more values.

10. A telecommunications device according to claim 9, said jitter buffer controller configured to activate a timer upon reception of a packet and stop said timer upon reception of a next packet.

* * * * *